Patented Aug. 14, 1951

2,564,401

UNITED STATES PATENT OFFICE 2,564,401

METHOD OF MAKING CELLULAR RUBBER USING AN ALKYL AMINE AND AMMONIUM BICARBONATE

John H. Kelly, Jr., Wabash, Ind., assignor to The General Tire and Rubber Company, Akron, Ohio, a corporation of Ohio No Drawing. Application July 2, 1947, Serial No. 758,722

10 Claims. (Cl. 260—2.5)

This invention relates to a method of making cellular or sponge rubber by processes involving mill or mass mixing from butalastic polymers and to an improved blowing agent which is suitable for addition to plastic rubber or butalastic polymer compounds in the making of cellular rubber products.

While for many years sponge rubber has been prepared from natural rubber by incorporating blowing agents into the masticated product and curing the mixture under conditions which permit an increased volume, the cellular products prepared from synthetic rubbers or butalastic polymers, for example copolymers of butadiene and styrene, by analogous methods have not been entirely satisfactory. Blowing agents which are used to release carbon dioxide at elevated temperatures have for some unknown reason failed to produce the low density sponge from synthetic rubbery polymers. Several relatively complex blowing agents have been recently developed which release nitrogen at elevated temperatures and the sponge produced with these blowing agents has been more satisfactory. These blowing agents, however, are usually quite complex and expensive or are difficult to produce.

It is therefore an object of the present invention to provide a blowing agent which is suitable for incorporation in solid natural and synthetic rubbers alike, and which will permit the attainment of a relatively low density sponge at relatively low cost.

It is another object of the present invention to provide a blowing agent which can be readily formed from relatively inexpensive raw materials, which is soluble in hydrocarbon synthetic rubbers and natural rubber alike, and which permits the attainment of relatively low density sponge.

It is another object of the present invention to provide a method of producing sponge rubbers from natural or synthetic rubbers, such as a copolymer of butadiene and styrene, in which a product having relatively uniform pores and density throughout is produced.

It is still another object of the present invention to provide a sponge rubber having relatively uniform density throughout.

I have found that exceptionally desirable cellular rubber products or sponge rubbers may be produced by incorporating in a plastic rubbery polymer, such as plasticized natural rubber, and copolymers of one or more butadiene compounds and one or more aryl vinyl compounds, such as styrene, alpha-methylstyrene, etc., a reaction product or mixture of an alkylamine, preferably a primary or secondary alkylamine, and ammonium carbonate.

The alkylamines and ammonium carbonate apparently combine to form reaction products which are readily distributed throughout the rubber polymer and which are broken down by heat to form carbon dioxide and ammonia that serves as a gaseous blowing agent. Because of the solubility or ease of distribution of the blowing agent in the polymer, a cellular rubber product of exceedingly low density and of especially desirable properties is obtained upon heating and vulcanizing under conditions permitting an increase in volume.

In a copending application, Serial No. 748,280, filed May 15, 1947 by John H. Kelly, Jr., the characteristics of sponge rubbers blown from butadiene-styrene copolymers with carbon dioxide were shown to depend largely upon the gel structure of the copolymer, as well as upon the manner in which the blowing agent is distributed throughout the matrix, or upon the compatibility of the carbon dioxide-releasing compound and the polymer, and upon the amount of cure or stage of the curing process when the blowing gas is largely released.

I have found, unlike the case where carbon dioxide is used as the blowing agent, a low density sponge rubber may be produced with rubbers and butalastic copolymers which contain no appreciable amount of gel when ammonia is given off in the blowing process. The presence of a gel phase is also unnecessary when the blowing gas is a mixture of or complex formed of carbon dioxide and ammonia as released from the above reaction product or mixture of an alkylamine and ammonium carbonate. Apparently, the carbon dioxide and ammonia released from my blowing agent are combined or combine to create an inflation complex which is much less soluble in the butalastic copolymers, such as the rubbery butadiene-styrene copolymers, than is carbon dioxide alone. I have produced, by the practice of the present invention, chemically blown sponge rubbers of exceptionally low density even though the compounded, plastic rubbery polymer contains no gel provided it has a low dilute solution viscosity, such as a dilute solution viscosity of 1.3 or less and preferably 1.2 or less.

The blowing agent is preferably formed exteriorly of the rubber by separately mixing the ammonium carbonate with the amine and allowing the resultant product to dry at ordinary temperatures to facilitate later incorporation in the rubbery polymer. The blowing agent, however, may be formed in situ in the rubber by separately mixing in the rubbery polymer the amine and ammonium carbonate. The amines and ammonium carbonate appear to react as a strong odor of ammonia results upon mixture of these materials. A relatively weak alkaline oxide, such as an oxide of zinc, magnesium, or other metal of group II of the periodic table of elements is also preferably present in admixture with the amine and ammonium carbonate.

About equal molecular proportions of the amine and ammonium carbonate are preferred, although either of these ingredients may be present in substantial excess if desired. The oxide should ordinarily be present in amounts of 20 to 150 per cent of the weight of the carbonate-amine reaction product and blowing agents containing about equal parts of ammonium carbonate and metal oxide, such as zinc oxide, are preferred.

The amines used in the preparation of the preferred blowing agents are the alkylamines having at least four or more carbon atoms. The longer chain amines are more oil-soluble than the shorter chain amines and thus function to distribute the carbon dioxide and ammonia, or the complex of these materials, throughout the rubber, so that all portions of the mixture become blown relatively uniform. The hydrocarbon-compatible amines, particularly the aliphatic primary and secondary amines, act as supplemental inflating agents according to their degree of volatility and may be used as the sole blowing agent to produce a spongy elastomer of reasonably good quality.

When it is desired to use an amine, such as an aliphatic amine that is not soluble in hydrocarbon oils or rubbers, such amines may be mixed with compatible oil-soluble materials such for example as a longer chain amine which serves as a coupling compound for the relatively nonoil-soluble amine. By the use of such mixtures, or by adding an oil miscible with the amine and the rubber, a substantial amount of nonoil-soluble or nonhydrocarbon-soluble amines may be used in forming the blowing agents.

The rubbery polymer into which the blowing agent is mixed may be a natural rubber, a sulfur-vulcanizable synthetic rubber such as any of the vulcanizable butalastic polymers, etc. It is preferably a copolymer of one or more butadiene compounds, such as butadiene and isoprene and other polymerizable dienes having double bonds in conjugated relationship and having less than seven carbon atoms, with an aryl vinyl compound such as styrene, alpha-methylstyrene, 3,4- or 3,5-dichloro-alpha-methylstyrenes, etc.

The rubbery polymer for the preparation of the extremely low density sponge rubbers to which this invention is primarily directed have relatively definite characteristics. They should be relatively highly plastic and preferably should have a plasticity from between 5 and about 25 or 30 when measure on the Mooney shearing disc plastometer. They should be further characterized by having a dilute solution viscosity less than 1.3 and preferably less than 1.2, coupled with a relatively low gel content, generally less than 10%, and preferably a zero gel content.

These preferred highly plastic rubber polymers are prepared directly in highly plastic form by polymerization with the aid of a substantial amount of modifier, such as one or more aliphatic mercaptans, such as dodecyl mercaptan, bis-(isopropyl xanthogen), etc. The amount of modifier used and the polymerization conditions determine the plasticity of the resultant polymer as is well-known in the art. The highly plastic rubbery polymers prepared with the aid of a substantial amount of mercaptans, such as hexadecyl mercaptan or other mercaptans having more than twelve carbon atoms, are particularly desirable in the present invention for making low density sponge rubbers as such polymers appear to have high plasticity coupled with low tackiness and are especially desirable for use in accordance with the present invention.

The highly plastic rubbery polymers prepared by other methods than by polymerization, as by the use of milling natural rubber or synthetic rubber with or without peptizing or chemical plasticizing agents, such as dibenzo-amido-diphenyl-disulfide, xylo mercaptans, etc., may also be used to produce sponge rubber of good quality in accordance with the present invention, but the density of the sponge rubber is generally not nearly as low as that produced by the polymerization processes directly.

The physical structure of the rubber, i. e. the amount and character of gel or cross-linked portion in relation to the plastic noncross-linked portion, which is often termed the sol portion, as well as the character of the sol portion, may be readily determined by standard methods promulgated by Rubber Reserve Corporation, which methods involve extracting the noncross-linked or soluble rubber from any tough cross-linked rubber by means of a solvent for the polymer, filtering and weighing the separated portions. Such extraction readily gives the proportions of the cross-linked or tough rubber material and the proportions of soluble or noncross-linked plastic polymeric material. The character of the sol portion is empirically measured by measuring the dilute solution viscosity of the solutions formed by the rubbery polymer.

Specifically, the recommended procedure is to add .4 gram of thinly sheeted rubbery polymer to a bottle containing 100 cubic centimeters of pure benzene, and after allowing the bottle to remain in a dark room for forty-eight hours, filtering the resultant solution through 100-mesh screen and collecting the filtrate. 25 cc. of the filtrate thus collected is evaporated to dryness and weighed. The amount of gel is the weight of the original sample, minus four times the weight of the residue remaining after such evaporation of the solvent. The dilute solution viscosity is obtained by measuring the ratio of the time required for a given amount of the aforementioned filtrate to flow through a given capillary to the time required for the same amount of pure benzene to flow through the same capillary; dilute solution or intrinsic viscosity is then equal to 2.3 times the log (base 10) of the above ratio, divided by the concentration in grams of polymer per 100 cc. of the above filtrate.

The Mooney plastometer is described in an article entitled "A Shearing Disc Plastometer for Unvulcanized Rubber" by Melvin Mooney, published in Industrial and Engineering Chemistry, Anal. Ed., 6, 147 (1934). The measurement of plasticity or plasticity standards are also described in the "Government Specifications for Synthetic Rubbers," July 1945.

The following examples, in which parts are by weight, illustrate the present invention:

*Example 1*

100 parts of ammonium carbonate and 100 parts of hexylamine, representing about 1.04 and .99 molecular equivalents, respectively, were mixed, spread out to have a relatively thin section, and allowed to stand twenty-four hours at room temperature to dry. The resultant reaction product contained 13.12 per cent of nitrogen when analyzed by a recognized method. The original reactants contained 21.53 per cent of nitrogen. An appreciable loss of ammonia was evidenced immediately after the mixing of the ingredients. The resultant product was thereafter utilized as a blowing agent for the blowing of rubbery polymers.

*Example 2*

Three separate inflating agents were prepared by mixing the parts by weight of the various compounds shown in the columns having the respective headings "A," "B," and "C" in the following table:

|  | A | B | C |
|---|---|---|---|
| Zinc Oxide | 100 | 100 | 100 |
| Ammonium Carbonate | 100 | 100 | 100 |
| Hexylamine |  | 100 | 200 |
| Mixed Coconut Oil Amines | 50 |  |  |

The coconut oil amines are a mixture of chemically pure alkylamines corresponding in chain lengths to the fatty acids normally present in coconut oil. The average molecular weight of this material is about 200; it melts at −10° C., and boils between 75° C. to 350° C. In the above inflating agents the respective molecular weight equivalents of the ingredients are 1.04, 0.25, and 1.23 for "A"; 1.04, 0.99 and 1.23 for "B"; and 1.04, 1.98 and 1.23 for "C."

After allowing the mixtures to dry for twenty-four hours, a nitrogen analysis of the products showed nitrogen contents of 8.78%, 9.35% and 8.41% for the respective blowing agents "A," "B" and "C," indicating the respective percentages of reaction to have been about 38%, 57% and 88%. The nitrogen analysis indicates that the percentage of nitrogen in the blowing agent is more or less constant, irrespective of the quantity of the amine.

The amines in the above examples may be substituted in whole or in part by other primary and secondary alkylamines having four to twenty carbon atoms, or by mixtures of one or more such amines with hydrocarbon oil-insoluble amines. Amines, such as isopropylamine, having less than four carbon atoms per hydrophilic group, with amines having more than four carbon atoms may also be used.

*Example 3*

|  | Mix A | Mix B |
|---|---|---|
|  | Parts | Parts |
| Butadiene-Styrene Copolymer | 100 | 100 |
| Whiting | 50 | 50 |
| Ditolylamine (antioxidant) | 1 | 1 |
| Zinc Oxide | 5 | 1 |
| Stearic Acid | 5 | 5 |
| Sulfur | 3.5 | 3.5 |
| Soda | 22 |  |
| Process Oil | 25 | 25 |
| Proprietary Plasticizing Oil | 10 | 10 |
| Butyraldehyde-Amine Condensation Product | .6 | .6 |
| Tetramethyl-thiuram-monosulfide | .06 | .06 |
| Blowing Agent from Example 2, Batch "A" |  | 10 |
| Hexylamine | 2 | 2 |
| Dihexylamine | 2 | 2 |

The above butadiene-styrene copolymer was especially polymerized to give zero gel content, average dilute solution viscosities of 1.28 to 1.30, and average Mooney shearing viscosity values of 25 to 30 after coagulation in the presence of 50% whiting loadings.

Discs were cut to fit molds 1.500" O. D. x .750" high and vulcanization was twenty minutes at 307° F. Mix A, a soda control, could be blown to not less than .18 ounce per cubic inch, while Mix B was consistently blown to .108 ounce per cubic inch.

*Example 4*

When the whiting of Example 3 was substituted by 25 parts of semi-reinforcing carbon black (Gastex), other materials and conditions remaining exactly the same, the sponge produced from the soda-blown control had a minimum density of .19 ounces per cubic inch and the sponge produced with the aid of the blowing agent of Example 2, Batch "A," had a density of .108 ounce per cubic inch. The vulcanization time was twenty minutes at 307° F. and the cellular rubber products were tough and elastic and had exceptional properties.

*Example 5*

When in Example 3, Batch "B," the blowing agents of Example 2, Batch "B" and Batch "C" were respectively substituted, other conditions remaining the same, the sponge produced also had a density of .108 ounce per cubic inch.

*Example 6*

|  | Parts |
|---|---|
| Butadiene-styrene copolymer (zero to low gel content) | 100 |
| Semi-reinforcing black | 25 |
| Cellulose floc-150 micron type | 10 |
| Ditolylamines (antioxidant) | 1 |
| Zinc oxide | 1 |
| Stearic acid | 5 |
| Process oil | 25 |
| Proprietary plasticizing oil | 10 |
| Butyraldehyde aniline condensation product | .6 |
| Tetramethyl-thiuram-monosulfide | .06 |
| Sulfur | 4.5 |
| Blowing agent from Example 2, batch A | 10 |

The products were mixed as in Example 3 and varying amounts were cured in a test mold having a diameter of 1.5 inches and a height of .75 inch to determine the minimum amount that would just fill the mold. The minimum density of the sponge which consistently filled the mold was .080 ounce per cubic inch. Such low density sponge, as far as I am aware, has not been obtained heretofore in a chemically blown rubber.

It will be seen from the above that the blowing agents of the present invention are exceptionally easy to disperse in natural rubbers and synthetic rubbers because of the compatibility of the amine compounds and the rubbers. The mixtures are relatively stable at moderately elevated temperatures encountered in storage, but readily give off the carbon dioxide during cure. Because of this marked stability and distributive power of the amine component and apparently because the rubbery polymers are much less permeable to the blowing agent than to carbon dioxide, cellular rubber products of very low density are produced with butadiene copolymers, such as GR–S, without providing a relatively large amount of gel therein.

The blowing agent is usually present in amounts such that the amine component is preferably present in amounts of from 2% to 10% or 15% of the weight of the rubbery polymer. Generally, less than 2% of the amine content may be used if relatively low density sponge rubbers are not required.

In accordance with another aspect of the present invention, the pore size may be regulated by proportioning the amount of primary and secondary alkylamines.

I have found that the presence of a primary alkylamine alone gives relatively large pores, probably due to the delaying or retarding action of these materials on the curing rate. The secondary alkylamines on the other hand when present alone impart relatively fine pores to the resultant cellular products. By mixing primary and secondary amines (preferably oil-soluble amines) pore size may be controlled as desired, particularly in the case of synthetic rubbers having a zero or low gel content and a dilute solution viscosity less than 1.2 or 1.3. Usually 20% to 50% of secondary amines are preferred in such mixtures. These primary and secondary alkylamines also should be oil-soluble and should ordinarily have at least four and preferably five to twenty carbon atoms. Examples of such alkylamines are hexyl and dihexyl amines, octyl and dioctyl amines, etc.

While the blowing agents prepared by mixing an amine and ammonium carbonate as above described give sponge rubbers of outstanding quality from the highly plastic rubbery polymers, which are characterized by having a dilute solution viscosity of less than 1.3 a Mooney plasticity of about 5 to about 25, and a relatively low gel content, other blowing agents suitable for blowing rubbery polymers may be used to give a spongy product useful for many purposes. The lower densities and greatest efficiency in utilizing the blowing agent occurs, however, with those blowing agents which give off nitrogen, ammonia, or mixtures of these materials with carbon dioxide. This is the case even though the blowing agent is not soluble in the rubbery product and hence can not give the uniform cell structure and other benefits had with reaction products of ammonium carbonate and a hydrocarbon-compatible amine as above described.

Although high pigment loading has previously been considered undesirable in making sponge rubbers, I have found it to be highly desirable in the case when the above described highly plastic polymers are used. The pigments like whiting and certain large particle size blacks, such as "Gastex," which have a particle size greater than 35 millimicrons improve the quality of the sponge and facilitate handling during processing. Around 3 to 10 parts of flocculated cellulose, with or without other pigment, is also especially desirable in reducing cold flow after extrusion of these sponge-forming mixtures.

It is to be understood that variations and modifications of the invention herein shown and described may be made without departing from the spirit of the invention.

What I claim is:

1. A method of producing a cellular rubber wherein a rubbery polymer of a polymerizable conjugated diolefinic compound having less than seven carbon atoms, in plastic form, is mixed with compounding and curing agents and cured under conditions permitting an increase in volume, the steps which comprise incorporating in the plastic rubbery polymer a product formed by mixing ammonium carbonate with an amino hydrogen-containing alkylamine having at least four carbon atoms, thereafter subjecting the rubbery mixture thus formed to elevated temperatures sufficient to cause release of gas from said product and thus expand the rubbery polymer, and curing the rubbery polymer in expanded condition, the total of the alkylamine components incorporated in the rubbery polymer being 2% to 10% of the weight thereof and the ammonium carbonate being present in an amount equivalent to a substantial portion of said amine.

2. The method of claim 1 wherein the alkylamine is a primary alkylamine having at least four carbon atoms.

3. A method of producing a cellular rubber wherein a rubbery polymer of a polymerizable conjugated diolefinic compound having less than seven carbon atoms, in plastic form, is mixed with compounding and curing agents and cured under conditions permitting an increase in volume, the steps which comprise dispersing through the plastic rubbery polymer a product formed by reacting a mixture of amino hydrogen-containing alkylamines with ammonium carbonate, thereafter subjecting the rubbery mixture thus formed to elevated temperatures to release gas from said blowing agent and thus expand the rubbery polymer, and curing the rubbery polymer in expanded condition, at least one of the amines in said mixture being an alkylamine having at least four carbon atoms, the total of the alkylamine components incorporated in the rubbery polymer being 2% to 10% of the weight thereof and the ammonium carbonate being present in an amount equivalent to a substantial portion of said amine.

4. The method of claim 1 wherein the alkylamine is a secondary amine.

5. The method of claim 1 wherein a primary and a secondary alkylamine is mixed with said ammonium carbonate.

6. In a method of producing a cellular rubber wherein a rubbery polymer of a conjugated diolefinic compound of less than seven carbon atoms, in plastic form, is mixed with compounding and curing agents and cured under conditions permitting an increase in volume, the steps which comprise dispersing through the plastic rubber a product formed by mixing a member of the group consisting of zinc and magnesium oxides with an amino hydrogen-containing alkylamine having at least four carbon atoms and ammonium carbonate, heating the plastic mixture at elevated temperatures to cause release of gas from said product, and curing the expanded mixture thus formed, the total of the alkylamine components incorporated in the rubbery polymer being 2% to 10% of the weight thereof and the ammonium carbonate being present in an amount equivalent to a substantial portion of said amine.

7. In a method of producing a cellular rubber wherein a rubbery copolymer of butadiene and styrene, in plastic form, is mixed with compounding and curing agents and cured under conditions permitting an increase in volume, the steps which comprise dispersing through the plastic copolymer a product formed by mixing a member of the group consisting of zinc and magnesium oxides with an amino hydrogen-containing alkylamine having at least four carbon atoms and ammonium carbonate, heating the plastic mixture at elevated temperatures to cause release of gas from said product, and curing the expanded mixture thus formed, the total of the alkylamine components incorporated in the rubbery polymer being 2% to 10% of the weight thereof and the ammonium carbonate being present in an amount equivalent to a substantial portion of said amine.

8. The process of claim 6 wherein a primary and secondary alkylamine are present in admixture with the rubbery polymer.

9. The method according to claim 1 further characterized in that the rubbery polymer prior to the curing step is characterized by having a Mooney plasticity between about 5 and about 25, an intrinsic viscosity in benzene not appreciably exceeding 1.3, and a gel content of less than 10%.

10. In a method of producing a cellular rubber, the steps which comprise incorporating in a plastic rubbery copolymer of butadiene and styrene having a substantially zero gel content and an intrinsic viscosity in benzene of less than 1.3, a product formed by mixing ammonium carbonate with an amino hydrogen-containing alkylamine having at least four carbon atoms, thereafter subjecting the rubbery mixture thus formed to elevated temperatures sufficient to cause release of gas from said product and thus expand the rubbery polymer, and curing the rubbery polymer in expanded condition, the total of the alkylamine components incorporated in the rubbery polymer being 2% to 10% of the weight thereof and the ammonium carbonate being present in an amount equivalent to a substantial portion of said amine.

JOHN H. KELLY, Jr.

REFERENCES CITED

The following references are of record in the file of this patent:

UNITED STATES PATENTS

| Number | Name | Date |
|---|---|---|
| 2,130,948 | Carothers | Sept. 20, 1938 |
| 2,132,969 | Ran | Oct. 11, 1938 |
| 2,234,204 | Starkweather et al. | Mar. 11, 1941 |
| 2,276,696 | Olin | Mar. 17, 1942 |
| 2,283,316 | Cooper et al. | May 19, 1942 |
| 2,299,593 | Roberts et al. | Oct. 20, 1942 |
| 2,386,273 | Shonle et al. | Oct. 9, 1945 |
| 2,466,027 | Horney et al. | Apr. 5, 1949 |
| 2,478,879 | Ten Broeck | Aug. 9, 1949 |

FOREIGN PATENTS

| Number | Country | Date |
|---|---|---|
| 331,227 | Great Britain | June 24, 1930 |

OTHER REFERENCES

Vanderbilt, 1942 Rubber Handbook 8th Ed. pp. 30, 31, 46, 47, 106, pub. 1942 by R. T. Vanderbilt Co., N. Y.

Gould p. 65–67 Rubber Age—April 1944.

White—Ind. and Eng. Chem. August 1945 pp. 770–775.